(12) United States Patent
Schober et al.

(10) Patent No.: US 6,406,578 B1
(45) Date of Patent: Jun. 18, 2002

(54) SEAL AND METHOD OF MAKING SAME FOR GAS LASER

(75) Inventors: Christina M. Schober, Hennepin; Timothy A. Beckwith, Anoka; Shari L. Jossi, Hennepin; Stuart D. Olson; Thomas G. Ostertag, both of Ramsey, all of MN (US)

(73) Assignee: Honeywell Inc., Morristown, NJ (US)

( * ) Notice: Subject to any disclaimer, the term of this patent is extended or adjusted under 35 U.S.C. 154(b) by 0 days.

(21) Appl. No.: 09/420,820

(22) Filed: Oct. 19, 1999

(51) Int. Cl.[7] .......................... B32B 31/26; H01S 3/034
(52) U.S. Cl. ............... 156/155; 156/89.11; 156/306.6; 65/36; 65/43
(58) Field of Search ................ 156/155, 89.11, 156/89.23, 306.6, 292; 65/17.3, 33.5, 33.6, 36, 42, 43, 58, 59.5

(56) References Cited

U.S. PATENT DOCUMENTS

| | | | |
|---|---|---|---|
| RE25,791 E | | 6/1965 | Claypoole |
| 3,495,045 A | * | 2/1970 | Varadi et al. |
| 3,558,975 A | * | 1/1971 | Ogle |
| 3,624,442 A | | 11/1971 | Smithgall et al. |
| 3,669,787 A | * | 6/1972 | Cornell |
| 3,767,497 A | * | 10/1973 | Sommer |
| 4,064,466 A | | 12/1977 | Seki et al. |
| 4,165,226 A | * | 8/1979 | Kita |
| 4,233,568 A | | 11/1980 | Hamerdinger et al. ...... 331/94.5 |
| 4,426,673 A | | 1/1984 | Bell et al. .................... 361/283 |
| 4,612,647 A | | 9/1986 | Norvell ....................... 372/88 |
| 4,618,802 A | | 10/1986 | Schrank |
| 4,713,825 A | | 12/1987 | Adsett |
| 4,817,112 A | | 3/1989 | Weber et al. ................. 372/94 |
| 4,828,597 A | * | 5/1989 | Glascock, II et al. |
| 4,848,909 A | | 7/1989 | Cole .......................... 356/350 |
| 5,056,920 A | | 10/1991 | Ahonen et al. ............. 356/350 |
| 5,371,592 A | * | 12/1994 | Beckwith et al. |
| 6,113,450 A | * | 9/2000 | Narayanan et al. |
| 6,218,005 B1 | * | 4/2001 | Moh |
| 2001/0001285 A1 | * | 5/2001 | Moh |

FOREIGN PATENT DOCUMENTS

| | | |
|---|---|---|
| EP | 0 201 854 | 11/1986 |
| FR | 2 301 937 | 9/1976 |
| FR | 2 620 238 | 3/1989 |
| JP | 3-261034 | * 11/1991 |
| JP | 5-6733 | * 1/1993 |

* cited by examiner

*Primary Examiner*—Curtis Mayes
(74) *Attorney, Agent, or Firm*—Dennis C. Bremer

(57) ABSTRACT

Affixing together two articles includes placing a frit preform with an adhesive material on the surface of either article. The preform and the articles are heated to cause the frit material to liquify and then cooled to affix together the two articles at the junction of the two articles.

12 Claims, 2 Drawing Sheets

SEAL AND METHOD OF MAKING SAME FOR GAS LASER

FIELD OF THE INVENTION

This invention is related to hard vacuum seals. More particularly, this invention is related to a method of providing a gas laser with a hard vacuum frit seal for laser components attached to a gas discharge cavity body.

BACKGROUND OF THE INVENTION

In many laser devices, a gas discharge cavity is provided by a tube or block, herein referred to as the laser block, consisting of glass, ceramic, glass ceramic, metal, or the like. Generally, attached to the laser block is a plurality of electrodes typically consisting of a metal such as aluminum, nickel-iron alloys, and the like. Further, attached to the laser block is at least two mirrors for establishing an optical path. For ring lasers, at least three mirrors are attached to the laser block for establishing a closed-loop optical path.

In order to provide low cost manufacturing of laser devices, the electrodes and mirrors may be attached to the laser block by a frit seal, sometimes referred to as a solder glass seal. Of course, for lasers, the frit seal must provide a hermetic seal between the components and the laser block, as particularly taught in U.S. Pat. No. 4,817,112, entitled "Low Cost Ring Laser Angular Rate Sensor", issued to Weber et al.

Another patent which shows the use of a frit seal is U.S. Pat. No. 4,233,568, entitled "Laser Tube Mirror Assembly", issued to Hamerdinger et al. As particularly described therein, a selected glass frit is chosen on the basis of its coefficient of thermal expansion. More particularly, the coefficient of thermal expansion of the frit material is generally selected to closely match the components which are being affixed to each other.

In order to apply the frit material to either a junction of two articles or sandwiched between mounting surfaces of the two articles, the frit material is typically mixed with a low viscosity vehicle to form a resultant slurry, with the frit material suspended therein. U.S. Pat. No. Re. 25,791 is exemplary in describing the characteristics of a solder glass or frit sealing process.

In manufacturing of lasers using the above glass frit/slurry, the components to be attached to the laser block, for example the electrodes and mirrors, are placed in position, and held in place with a light force, e.g. a spring loaded force. In turn, the frit/slurry, or simply "the slurry", is applied to the peripheral junction of the component to be attached and the laser block by a variety of techniques, including, among others, dipping, pressure flow, brushing, use of a syringe, or other "toothpaste-like" dispensing techniques.

After the slurry has been applied to the peripheral junction of the component and the laser block, the temperature of the components, laser block, and slurry are raised to a fritting temperature sufficient to allow the frit material to change to its liquid or fluid state which results in a liquid glass surrounding the aforementioned junction. This step is followed by a cooling period during which time the frit material returns to its "glass" state thereby forming a hermetic seal at the junction of the component to the laser block.

The aforementioned process is described in further detail in the aforementioned U.S. Pat. No. 4,233,568. However, with respect to laser devices, it should be noted that the aforementioned process is preferably one of placing the frit material around the junction of the components and the laser block, as opposed to being sandwiched between the mounting surface of the component and a mounting surface of the laser block.

Although the "slurry" process as just described provides an adequate hermetic seal, it has a number of disadvantages. For example, the frit/slurry combination is sensitive to the "mix ratio" of the frit material and the vehicle. This may lead to inconsistencies in the completeness, strength, coefficient of thermal expansion induced stress, and the hermeticity of the seal. Secondly, the slurry process does not lend itself to consistent application of the slurry material from one component to the next, thereby decreasing the reliability of the seal in high volume production. Lastly, the frit/slurry process does not lend itself to "automated" production techniques because of the difficulties encountered in the application of the slurry surrounding the junction of the component and the laser block.

SUMMARY OF THE INVENTION

An object of the present invention is to provide a frit seal without the disadvantages of a frit/slurry seal method.

Another object of the invention is to provide a consistent frit seal between two articles intended to be affixed to each other.

The present invention pertains to both a method and apparatus of a novel seal particularly useful in the manufacture of lasers, and other kinds of gas discharge devices. More particularly, this invention pertains to the attachment of electrodes and/or mirrors to a body which provides a gas discharge cavity.

In the present invention, two articles are provided with mounting surfaces which are to be joined together. The first article is held against second article forming a peripheral junction. A ring shaped preform is placed on the mounting surface of the second article in proximity of the first and second articles. The preform material consists substantially of a frit material for forming a seal between the two articles which are intended to be attached to each other. The combination of the two articles and preform is heated to a sufficient temperature to cause the frit material to change to a liquid state to thereby form a hermetic seal after cooling.

DETAILED DESCRIPTION OF THE INVENTION

Figure 1:
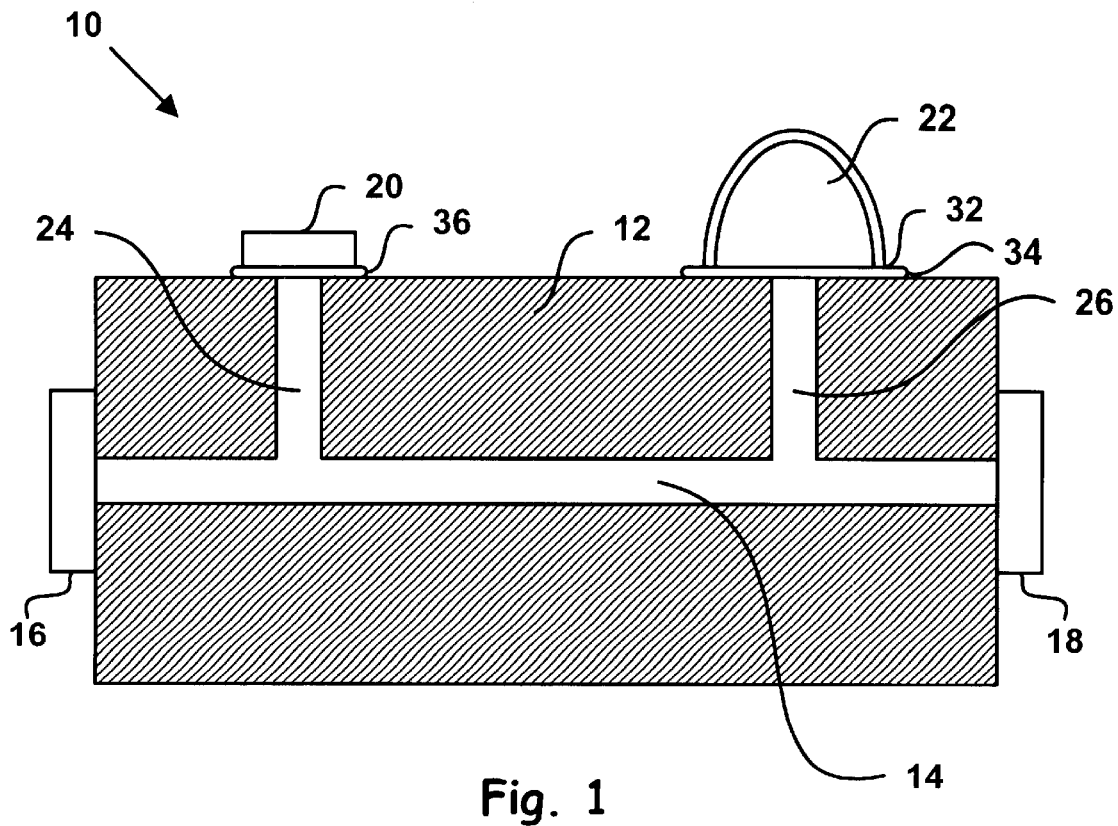
FIG. 1 is a cross-sectional view of a laser.

Referring now to FIG. 1, thereshown is a cross-sectional view of a laser 10 similar to that illustrated in U.S. Pat. No. 4,612,647, issued to Norvell, entitled "High Performance Laser And Method Of Making Same". The last referred-to patent describes a method for securing an electrode to a laser body or block using field-assisted bonding. Laser 10 includes a laser block 12 which may be provided by a variety of glass, glass ceramics, metals, or the like so as to provide a lasing cavity 14 within laser block 12. Highly polished mirrors 16 and 18 are fixed to the laser block 12 at opposite ends of the lasing cavity 14 so as to provide an optical path to establish, lasing operation in a well known manner. Two electrodes, anode 20 and cathode 22, communicate with the lasing cavity 14 through upright bores 24 and 26, respectively.

Cathode 22 is generally hemispherical, with a mounting surface 32. Cathode 22 may be constructed from a wide variety of materials including, among others, aluminum, nickel alloys, beryllium, and even glass with an electrically conductive coating such as taught in U.S. Pat. No. 4,612,647. The details of cathode 22, as well as anode 20, are beyond the scope of the present invention. However, common to both electrodes is that they generally have a ring-shaped mounting surface intended to be attached to a flat mounting surface of laser block 12 or other body forming the gas discharge cavity.

For example, in FIG. 1, anode 20 is illustrated as a button-like electrode sealed to laser block 12 with an indium seal 36. Cathode 22 is illustrated fixed to laser block 12 by an indium seal 34. In the present invention, indium seals 34 and 36 are replaced by a glass frit seal, the description of which follows.

Mirrors 16 and 18 are commonly joined to laser block 12 by an optical contact, or frit seal. The stability of the seal is particularly critical for ring lasers since the laser beams therein must traverse a polygonal ring path. Therefore, alignment of the mirror surfaces, at least three, relative to each other, is critical so that an optical closed loop path may be established as defined by the mirror surfaces as is well known. Of course, if a frit seal is chosen as the method of attachment of the mirror component to the laser block, the coefficient of thermal expansion of the frit material must be as chosen to be as close as possible to both the mirror component as well as the laser block so that alignment of the mirrors is minimally altered by temperature effects.

In the present invention, the term "frit" is intended to mean any of a wide variety of materials which form a glass or glass-like seal, such materials being either vitreous or non-vitreous. Such frit materials may include other elements, for example a lead-glass or the like. Examples of frit materials are particularly identified in the aforesaid U.S. Pat. No. 4,233,568 which lists frit materials, and their corresponding coefficient of thermal expansion properties and their fritting temperatures, from Corning Glass Works and Schott Optical Glass Company. Examples of frit materials suitable in the present invention for use with a laser block and mirror substrate built from a borosilicate glass such as BK-7 glass, from Corning Glass Works, having a coefficient of thermal expansion of $8.3 \times 10^{-6}/°$ C. are Corning 7570 vitreous frit material having a coefficient of thermal expansion of $8.4 \times 10^{-6}/°$ C., Corning 7575 vitreous frit material having a coefficient of thermal expansion of $8.9 \times 10^{-6}/°$ C., and Schott G017-340 having a coefficient of thermal expansion of $8.3 \times 10^{-6}/°$ C.

Figure 2A:
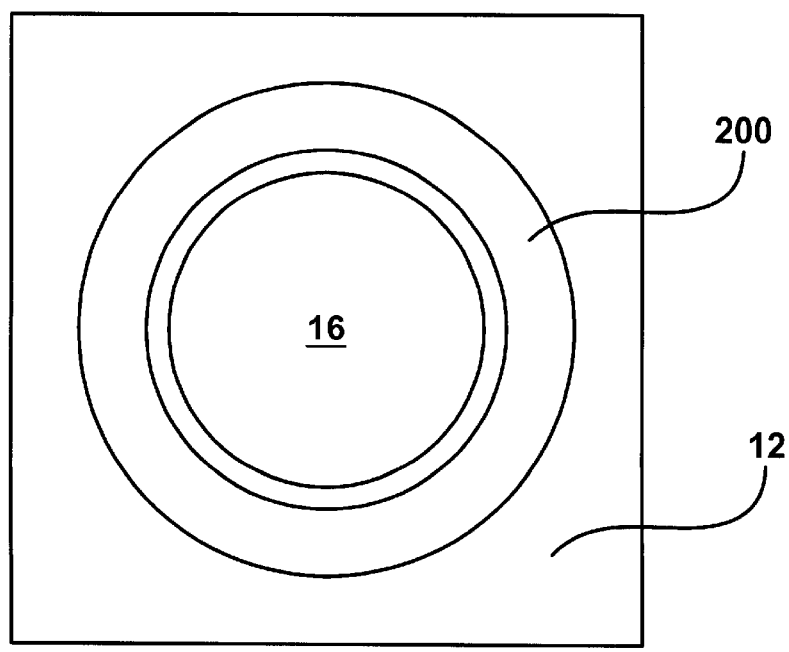
FIG. 2a is planar view of a frit seal in accordance with the present invention.
Figure 2B:
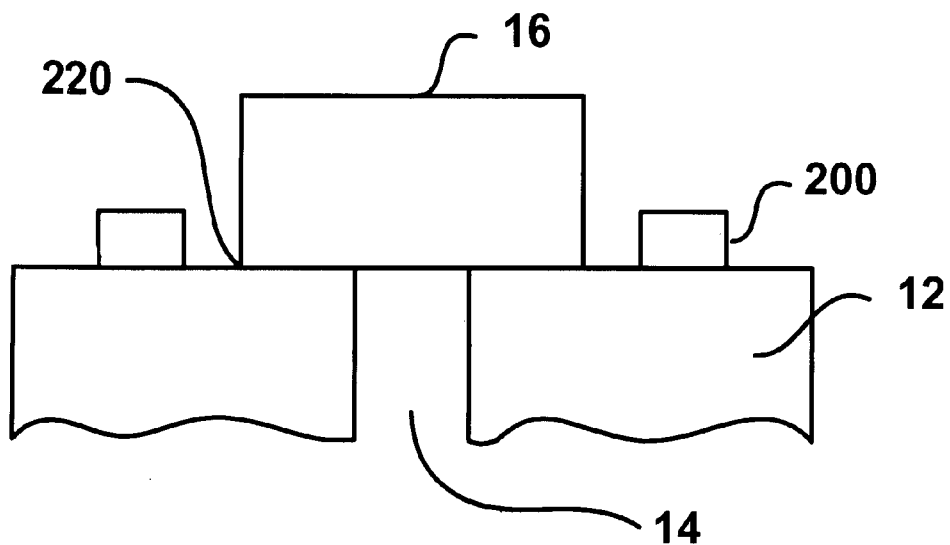
FIG. 2b and FIG. 2c are cross-sectional views of the frit seal before and after the fritting process in accordance with the present invention.
Figure 2C:
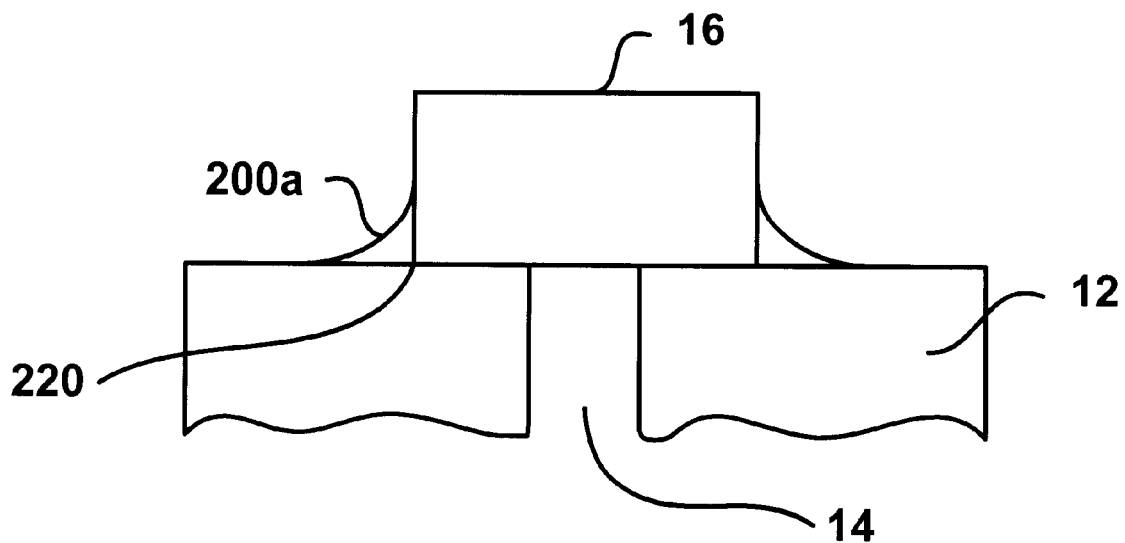

Illustrated in FIGS. 2a, 2b, and 2c is one embodiment of the invention for attaching mirror component 16 to laser block 12, like those components illustrated in FIG. 1, by use of a "frit preform" 200. FIGS. 2a and 2b illustrate the assembly of the mirror component 16 to laser block 12 prior to the "fritting process", and FIG. 2c illustrates the attachment of the mirror component 16 to laser block 12 after the fritting process. More specifically, FIGS. 2a and 2b illustrate a ring-shaped frit preform 200 having an aperture therethrough. As is well known in the laser art, mirror 16 includes a mirror coating (not shown) to be in communication with lasing cavity 14. Mirror 16 is illustrated as being cylindrically shaped, and being disposed within the aperture of preform 200.

FIG. 2c diagrammatically illustrates the resulting frit seal 200a after the combination of the mirror 16, laser block 12, and frit preform 200 have been heated to the fritting temperature, and subsequently cooled to form the glass frit seal. At the fritting temperature, the frit material changes to a liquid state. The components as illustrated in FIGS. 2a and 2b are held in place by an adhesive.

With the adhesive, the process to hold the frit preform 200 in place can be performed on a non-horizontal surface while the frit seal 200a forms. This process is performed by tacking the frit preform 200 in place with adhesive so that no fixturing is required. The frit preform 200 is tacked by a material that has a capability to bind in volatile matrix solvents such as a lacquer. The tacking material is placed on the surface to form a film. This holds the frit preform 200 lightly against the block. A benefit to the non-horizontal process is that manufacturing could be performed in a much less complex manner by forming multiple frits at one time rather than forming one frit at a time. A benefit to the use of the tacking material is that it burns off completely after the heating process. Therefore, no residue or debris is left that would contaminate or add stress to the frit seal 200a.

After the fritting process, the combination as aforesaid is allowed to cool, resulting in a hermetic frit seal 200a surrounding the peripheral junction 220 of mirror 16 and laser block 12. The use of the ring shaped preform 200 in accordance with the present invention results in the flit preform 200 "shrinking" around the junction 220 of the mirror 16 and laser block 12 during the fritting and wetting process thereby enhancing the seal over that of using a frit/slurry.

The dimensional aspects of mirror 16: and preform 200 may have wide variations, all of which are considered to be within the scope of the present invention. One example of a practical embodiment of the present invention is one in which preform 200 has an outside diameter of 0.398 inches, inside diameter of 0.320 inches, and having a thickness of 0.035 inches; and mirror component 16 is composed of BK-7 glass having an outside diameter of 0.300 inches.

It should be noted that frit preform 200 consists generally of a frit material held together by any of a variety techniques. For example, Corning Glass Works provides a product under the registered trademark of "Multiform and Clearform" products. These products are intricate non-porous, vacuum tight bodies of pressed glass made by the "powder processing" of glass. Granulated glass particles are dry-pressed into shape and fired at high temperature to fuse them into a tight shaped structure. Other types of preforms are within the scope of the present invention including sintered glass preforms, as well as those preforms held together by a "wax-like" binder for maintaining the preform shape. In the present invention, use of the preforms as aforesaid permits the fritting process requiring only one heating step, the temperature being only sufficient to cause the frit material to change to a liquid state.

The description of the invention as thus described with reference to FIGS. 2a, 2b, and 2c are applicable to any component other than mirror component 16 being attached to laser block 12. That is, anode 20 or cathode 22 may be fixed to laser block 12 in the same manner. With reference to FIG. 2b, mirror 16 may be replaced by anode 20, cathode 22, or any other article in practice of the present invention.

All those skilled in the art will recognize that only preferred embodiments of the present invention have been disclosed herein, and that the embodiments may be altered and modified without departing from the true spirit and scope of the invention as defined in the accompanying claims. More specifically, the Figures generally depict laser components as articles which are mounted to another article shown as laser block 12. The Figures, furthermore, generally depict an article which has an annular or ring-shaped mounting surface which when joined to the laser block form an annular junction between the component and the laser block. It is intended that components other than having an annular mounting surface are within the scope of the present invention.

The frit preforms illustrated in the accompanying drawings have also been shown to be ring-shaped construction. When such ring-shaped preforms are applied around components which are also annular, the frit process lends itself to the frit preform shrinking around the peripheral junction of the component to the laser block as a result of the fritting process. Although a ring shape preform is preferred, other shapes, for example rectangular-shaped preforms, are also within the scope of the present invention since they too will provide wetting and shrinking around the junction of the component and the article which is intended to be joined thereto.

The embodiments of the invention in which an exclusive property or right is claimed are defined as follows:

1. A method of providing a frit preform in close proximity to a site to be sealed, the method comprising:
   placing the frit preform on a block;
   placing a component substantially within the frit preform;
   applying an adhesive material to the frit preform to cause a film to form on the block;
   burning off the adhesive material by heating the block and the frit preform; and
   cooling the block and the frit preform, thereby forming a bond between the block, the component, and the frit preform that is substantially free of any residue associated with the adhesive material.

2. The method of claim 1, wherein the component is a laser component selected from the group consisting of a mirror, a cathode, and an anode.

3. The method of claim 1, wherein the component is a gas discharge cavity component.

4. The method of claim 3, wherein the gas discharge cavity component is an electrode.

5. The method of claim 1, wherein the adhesive material is a lacquer.

6. The method of claim 1, wherein the film is capable of substantially binding the component to the block anywhere the frit preform is placed on the block, thereby allowing non-horizontal processing to be performed.

7. The method of claim 1, wherein the block is a laser block.

8. The method of claim 1, wherein the block is a gas discharge cavity block.

9. The method of claim 1, wherein the block is composed of borosilicate glass.

10. The method of claim 9, wherein the borosilicate glass is BK-7.

11. The method of claim 1, wherein the frit preform is composed of glass.

12. A method of providing a glass frit preform in close proximity to a site to be sealed, the method comprising:
    placing the glass frit preform on a block, wherein the block is composed of BK-7 borosilicate glass;
    placing a component substantially within the glass frit preform;
    applying a lacquer to the glass frit preform to cause a film to form on the block, wherein the film is capable of substantially binding the glass frit preform and the component to the block anywhere the glass frit preform is placed on the block, thereby allowing non-horizontal processing to be performed;
    burning off the lacquer by heating the block, the component, and the glass frit preform; and
    cooling the block, the component, and the glass frit preform, thereby forming a bond between the block, the component, and the glass frit preform that is substantially free of any residue associated with the lacquer.

* * * * *